Figure 1:
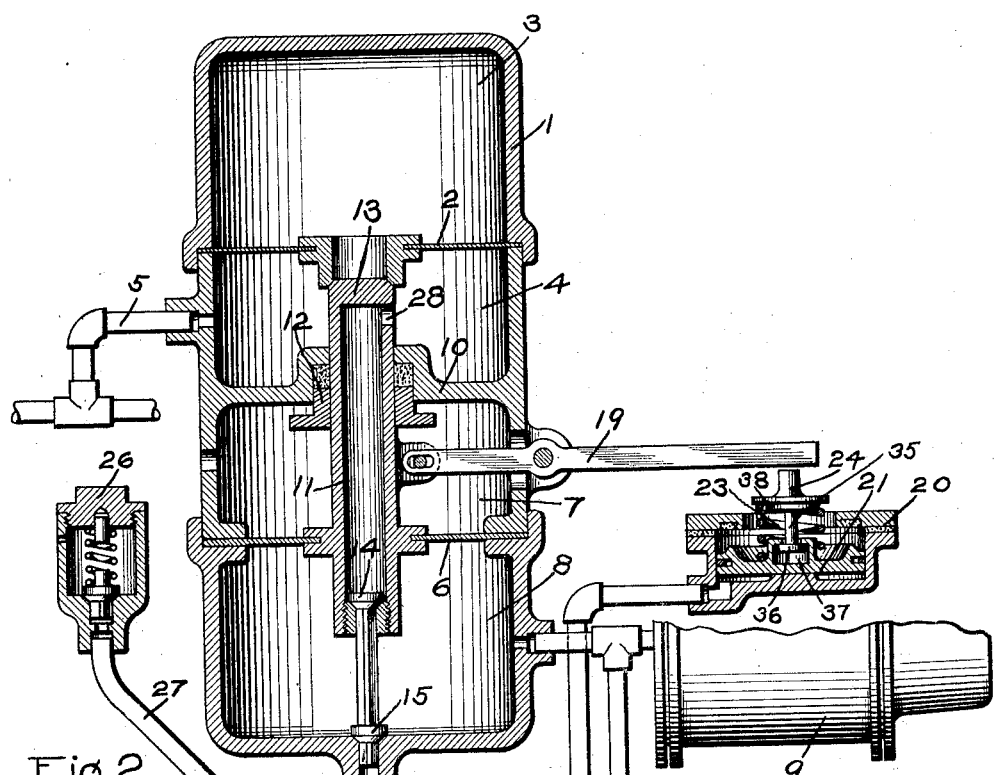

C. C. FARMER.
FLUID PRESSURE BRAKE.
APPLICATION FILED JUNE 30, 1920.

1,400,594.

Patented Dec. 20, 1921.

INVENTOR
Clyde C. Farmer
by Wm. M. Cady
Att'y.

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,400,594.      Specification of Letters Patent.     Patented Dec. 20, 1921.

Application filed June 30, 1920. Serial No. 392,965.

*To all whom it may concern:*

Be it known that I, CLYDE C. FARMER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake controlling valve device.

It has heretofore been proposed to provide a valve device for controlling the fluid pressure brakes on vehicles of a railway train, in which the valve means for controlling the supply of fluid under pressure to the brake cylinder to effect an application of the brakes is operated by a movable abutment subjected to the opposing pressures of the brake cylinder and the brake pipe.

It is sometimes desired to retain a certain pressure in the brake cylinder, particularly where a train is operating on a grade, in order that the brakes will not be entirely released when the brake pipe pressure is increased and the controlling valve device is moved to release position, so that the system may be recharged with fluid under pressure without losing control of the train.

With a brake controlling valve device of the above character, when a retaining valve device is cut in to retain pressure in the brake cylinder, if the brakes are released after an application of the brakes, the pressure retained in the brake cylinder still acts on the movable abutment and thereby destroys the normal balance, so that when another application of the brakes is made it is necessary to reduce the brake pipe pressure from normal by the amount retained in the brake cylinder in addition to the amount necessary to increase the brake cylinder pressure to the desired degree.

Where one or more brake controlling valve devices of the above character are mixed in a train with brake controlling valve devices of the ordinary equalizing type in which the brake cylinder pressure is dependent upon the operation of a movable abutment subject to the opposing pressures of the brake pipe and the auxiliary reservoir, it will be evident that when the retaining valves are cut in, the brake cylinder pressure obtained upon a given reduction in brake pipe pressure on cars equipped with the usual automatic fluid pressure brake will be much greater than that obtained on cars equipped with the brake cylinder pressure governed type of valve device.

The principal object of my invention is to overcome the above difficulty by providing means associated with the brake controlling valve device for balancing the effect of fluid pressure retained in the brake cylinder.

In the accompanying drawing; Figure 1 is a diagrammatic sectional view of a brake controlling valve device embodying my invention; and Fig. 2 a sectional view of the cut-out cock in position for retaining fluid in the brake cylinder.

It will be understood that the construction shown in the drawing is more or less diagrammatic and is intended to indicate any brake controlling valve device of the type having a movable abutment mechanism subject to the opposing pressures of the brake cylinder and the brake pipe for controlling the brakes.

As shown in the drawing, there is provided a casing 1 containing a movable diaphragm 2 forming the chambers 3 and 4, the chamber 4 being connected to the automatic brake pipe 5. Another movable diaphragm 6 is mounted in the casing 1, forming chambers 7 and 8, the chamber 7 being open to the atmosphere and the chamber 8 being connected to the brake cylinder 9. A partition wall 10 separates the chamber 4 from chamber 7.

Carried by the diaphragm 6 is a hollow valve stem 11 which extends through a stuffing box 12 in the wall 10 and is provided with a valve 13 adapted to seat on a valve seat carried by the diaphragm 2. The opposite end of the valve stem 11 is provided with a valve seat for a brake cylinder supply valve 14 and connected to the stem of said valve is an exhaust valve 15.

The exhaust pipe 16 leading from the exhaust valve 15 is connected to a controlling cock comprising a casing 17 containing a valve 18.

Connected to the valve stem 11 preferably in the atmospheric chamber 7 and pivotally mounted on the casing 1 is a lever 19, and arranged adjacent to the outer end of the lever is a casing 20, containing a piston 21 having the chamber at one side connected to a pipe 22 leading to the controlling cock casing 17 and having a coil spring 23 mounted on the opposite side.

The coil spring 23 is maintained under an initial compression by confining the same between a member 38 having a stem 24 and the piston 21, the member 38 having a downwardly projecting stem 35 carrying a head 36 contained in a pocket 37 formed in the piston 21.

The pocket 37 permits relative movement of the head 36 and the stem 24 is normally spaced from the lever 19, so that when the piston is not actuated by fluid pressure, the lever 19 can move freely in response to the movement of the diaphragms 2 and 6.

A retaining valve device 26 of the usual construction is connected by a pipe 27 to the valve casing 17.

In operation, fluid supplied to the brake pipe 5 in the usual manner, flows to chamber 4 and acts on diaphragm 2 so as to lift the seat of the valve 13 and permit fluid from the brake pipe to charge the chamber 3. When the opposing pressures on the diaphragm have substantially equalized, the diaphragm 2 returns the valve seat to normal position, so as to close the valve 13.

If it is desired to effect an application of the brakes, the brake pipe pressure is reduced, and the superior fluid pressure bottled up in chamber 3 then acts on the diaphragm 2 to depress the valve stem 11, so that the valve seat of the valve 14 is moved away from the valve, permitting the flow of fluid from the chamber 4 and the brake pipe through port 28 and the hollow valve stem to chamber 8 and the brake cylinder 9.

The brake cylinder pressure acts in chamber 8 on diaphragm 6 and when the brake cylinder pressure has been increased to a point at which the opposing pressures on the diaphragms 2 and 6 are substantially balanced, the valve stem 11 will be moved to close the valve 14.

The diaphragm 6 is preferably made of less area than the diaphragm 2 so that a pressure in the brake cylinder greater than the reduction in pressure in the brake pipe is required to balance the pressures on the diaphragms. For example, the ratio of the areas of the diaphragms may be such that for every pound reduction in brake pipe pressure, the brake cylinder pressure must be increased two and one-half pounds in order to bring about a balance of pressures.

The brakes may be released by increasing the brake pipe pressure, which increase acts on the diaphragm 2 so as to destroy the balance and permit the brake cylinder pressure in chamber 8 to move the diaphragm 6 and thereby lift the exhaust valve 15 from its seat.

If the retaining valve is to be cut out, the valve 18 is turned to the position shown in Fig. 1, in which the exhaust pipe 16 is connected through cavity 29 with an atmospheric exhaust port 30 as well as the returning valve 26, and the pipe 22 is also connected through cavity 31 and port 32 with cavity 29 and exhaust port 30, so that the chamber below the piston 21 is maintained at atmospheric pressure, rendering the spring 23 inactive.

Fluid from the brake cylinder is thus vented to the atmosphere in this position of the controlling cock.

Figure 2:
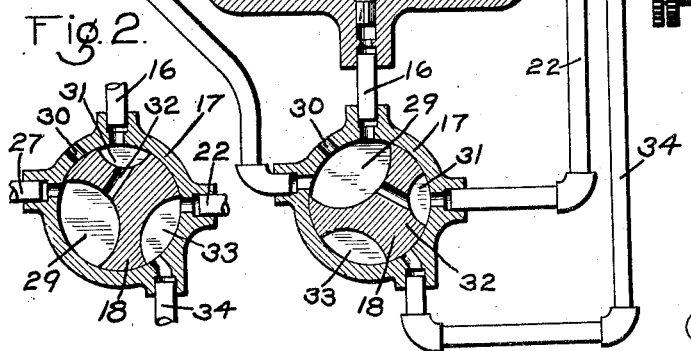

If it is desired to retain pressure in the brake cylinder, the valve 18 is turned to the position shown in Fig. 2 of the drawing, in which the exhaust pipe 16 is connected to the retaining valve 26, with the atmospheric exhaust port 30 cut off, through cavity 31, port 32 and cavity 29. The pipe 22, in this position of the cock, is connected through cavity 33 with a pipe 34 leading to the brake cylinder 9.

When the brakes are applied and then the brake pipe pressure is increased to release the brakes, fluid under pressure will be retained in the brake cylinder according to the pressure at which the retaining valve is adjusted.

The pressure in the brake cylinder is also admitted through pipe 34, cavity 33 and pipe 22 to the piston 21, so that said piston is shifted to its upper seated position, in which the stem engages the lever 19 and the pressure of the spring 23 acts to oppose the movement of the lever 19.

It will now be seen that the brake cylinder pressure retained in the brake cylinder and acting in chamber 8 on diaphragm 6 will be opposed by the pressure of spring 23, so that by making this spring pressure to substantially equal the retained brake cylinder pressure the brake controlling valve device will act in response to a reduction in brake pipe pressure to apply the brakes and with pressure retained in the brake cylinder as though the retaining valve were not cut in and consequently, the brake controlling valve devices will work in harmony in a train with ordinary triple valve devices.

Having now described my invention, what I claim as new and desire to secure by Letters Patent, is:—

1. In a fluid pressure brake, the combination with a brake cylinder and brake pipe, of a brake controlling valve device subject to the pressures of the brake cylinder and brake pipe and means for compensating brake cylinder pressure on said valve device retained in the brake cylinder.

2. In a fluid pressure brake, the combination with a brake cylinder and brake pipe, of a brake controlling valve device subject to the pressures of the brake cylinder and brake pipe, means for retaining fluid under pressure in the brake cylinder, and means acting on said valve device for neutralizing the effect of brake cylinder pressure retained in the brake cylinder.

3. In a fluid pressure brake, the combination with a brake cylinder and brake pipe, of a brake controlling valve device subject to the pressures of the brake cylinder and brake pipe, means for retaining fluid under pressure in the brake cylinder, and means operated upon retaining fluid under pressure in the brake cylinder for opposing the brake cylinder pressure on said valve device which is retained in the brake cylinder.

4. In a fluid pressure brake, the combination with a brake cylinder, and brake pipe, of a movable abutment subject to the opposing pressures of the brake cylinder and brake pipe, means operated by said abutment for supplying fluid to the brake cylinder, and means operated by brake cylinder pressure for opposing the pressure of the brake cylinder on said abutment.

5. In a fluid pressure brake, the combination with a brake cylinder and brake pipe, of a brake controlling valve device subject to the opposing pressures of the brake cylinder and brake pipe, a retaining valve device adapted to be connected to the brake cylinder, and means operated upon connecting the retaining valve device to the brake cylinder for opposing brake cylinder pressure on said brake controlling valve device.

6. In a fluid pressure brake, the combination with a brake cylinder and brake pipe, of a brake controlling valve device subject to the pressures of the brake cylinder and brake pipe, a spring, and means for subjecting said valve device to the pressure of the spring in opposition to brake cylinder pressure upon retaining fluid under pressure in the brake cylinder.

7. In a fluid pressure brake, the combination with a brake cylinder and brake pipe, of a brake controlling valve device subject to the pressures of the brake cylinder and brake pipe, means for retaining fluid under pressure in the brake cylinder, a normally inactive spring, and means operated upon retaining fluid under pressure in the brake cylinder for subjecting said valve device to the pressure of said spring in opposition to the brake cylinder pressure.

8. In a fluid pressure brake, the combination with a brake cylinder and brake pipe, of a valve device subject to brake pipe and brake cylinder pressures and a substantially constant pressure for controlling the brakes, a retaining valve device, means for connecting said retaining valve device to the brake cylinder, and means operated upon connecting said retaining valve device to the brake cylinder for opposing the brake cylinder pressure on said brake controlling valve device.

9. In a fluid pressure brake, the combination with a brake cylinder, of a valve device subject to brake cylinder pressure for controlling the supply of fluid to the brake cylinder and means operated by brake cylinder pressure for opposing the brake cylinder pressure on said valve device.

10. In a fluid pressure brake, the combination with a brake cylinder, of a valve device subject to brake cylinder pressure for controlling the supply of fluid to the brake cylinder, a retaining valve device for retaining fluid under pressure in the brake cylinder, and means for opposing the brake cylinder pressure acting on said valve device when the retaining valve device is cut in.

In testimony whereof I have hereunto set my hand.

CLYDE C. FARMER.